(12) United States Patent
Shima et al.

(10) Patent No.: US 7,069,199 B2
(45) Date of Patent: Jun. 27, 2006

(54) GRID CONVERGENCE SOLUTION COMPUTATION SYSTEM

(75) Inventors: Eiji Shima, Kakamigahara (JP); Akio Ochi, Kakamigahara (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 416 days.

(21) Appl. No.: 10/327,967

(22) Filed: Dec. 26, 2002

(65) Prior Publication Data

US 2003/0139915 A1    Jul. 24, 2003

(30) Foreign Application Priority Data

Dec. 28, 2001  (JP)  ............................. 2001-401130

(51) Int. Cl.
  *G06F 17/50*  (2006.01)
  *G06T 15/00*  (2006.01)

(52) U.S. Cl. .................. 703/2; 703/9; 702/12; 345/418

(58) Field of Classification Search ................. 703/2, 703/9, 22; 716/5; 702/12, 14; 345/418, 345/420

See application file for complete search history.

(56) References Cited

U.S. PATENT DOCUMENTS

| | | | | |
|---|---|---|---|---|
| 4,809,202 A | * | 2/1989 | Wolfram | ........................ 703/9 |
| 4,843,563 A | * | 6/1989 | Takahashi et al. | ............ 716/21 |
| 4,969,116 A | * | 11/1990 | Wada et al. | ..................... 716/5 |
| 5,729,451 A | * | 3/1998 | Gibbs et al. | .................... 702/12 |
| 5,801,969 A | * | 9/1998 | Nagahama | ...................... 703/9 |
| 5,923,329 A | * | 7/1999 | Beale | ......................... 345/418 |
| 6,138,076 A | * | 10/2000 | Graf et al. | ..................... 702/14 |
| 6,356,860 B1 | * | 3/2002 | Barnette | ........................ 703/2 |

OTHER PUBLICATIONS

"FORTRAN77 Numerical Computation Programming", pp. 12-17, Dec. 5, 1991.
De Sterck, H. et al., "Stationary Two-Dimensional Magnetohydrodynamic Flows with Shocks: Characteristic Analysis and Grid Convergence Study," Journal of Computational Physics 166, 28-62 (2001), pp. 28-62, XP-002322734.
Roache, P. J., "Perspective: A Method for Uniform Reporting of Grid Refinement Studies," Journal of Fluids Engineering, Sep. 1994, vol. 116, pp. 405-413, XP008044971.
Zhang, X. D. et al., "Numerical Assessment of Error Estimators for Euler Equations," AIAA Journal, vol. 39, Sep. 2001, pp. 1706-1715, XP008044968.
Zingg, D. W. et al., "Comparison of Several Spatial Discretizations for the Navier-Stokes Equations," Journal of Computational Physics 160, 683-704 (2000), pp. 683-704, XP-002322735.

* cited by examiner

*Primary Examiner*—Thai Phan
(74) *Attorney, Agent, or Firm*—Oliff & Berridge, PLC (57) ABSTRACT

A grid convergence solution computation system computes a computed value ($A_{high}$) Of high-order accuracy, using a single grid, computes a computed value ($A_{low}$) of low-order accuracy, using the same single grid, and computes a grid convergence solution based on the relation between the computed value ($A_{high}$) of high-order accuracy and the computed value ($A_{low}$) of low-order accuracy on an assumption that the relation between the computed value ($A_{high}$) of high-order accuracy, the computed value ($A_{low}$) of low-order accuracy, and the grid convergence solution ($A_{conv}$) is substantially constant regardless of fineness or coarseness of the grid. The grid convergence solution computation system computes a highly accurate grid convergence solution ($A_{conv}$) by using small computational complexity.

16 Claims, 6 Drawing Sheets

GRID CONVERGENCE SOLUTION COMPUTATION SYSTEM

BACKGROUND OF THE INVENTION

1. Field of the Invention

The present invention relates to a system for grid convergence solution computation and a method for the same, and, more specifically, to grid convergence solution computation system and method capable of being effectively used for determining the airfoil cross section of, for example, a rotor blade for a rotary-wing aircraft.

2. Description of the Related Art

Computational fluid dynamics (CFD) capable of working out solutions to fluid-dynamic problems by numerically solving fluid-dynamic governing equations using a computer has made a rapid progress in recent years. A desired airfoil cross section of a rotor blade of a rotary-wing aircraft is predicted analytically by CFD prior to determining the airfoil cross section through wind tunnel tests and actual aircraft tests.

Figure 8:
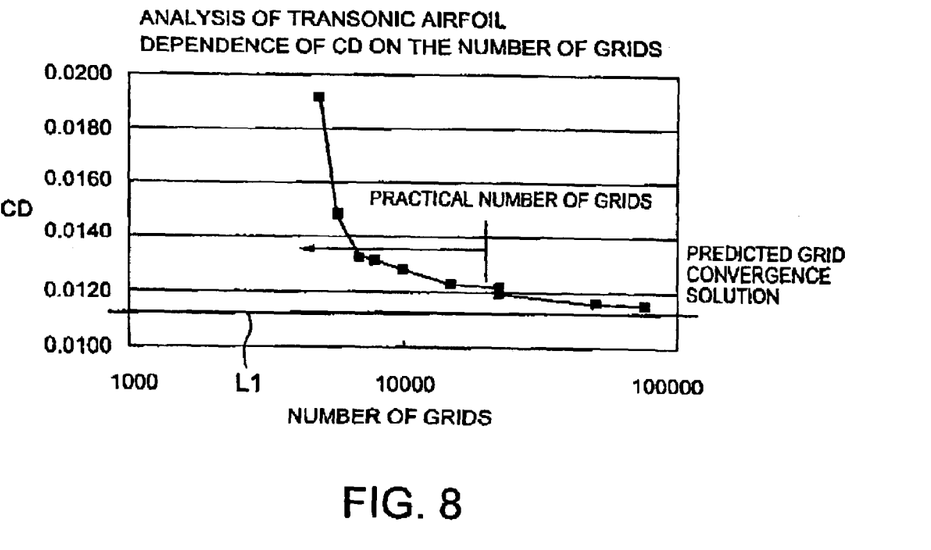
FIG. 8 is a graph showing the relation between the number of grids and drag coefficient for a typical two-dimensional cross section of a middle part of an airfoil determined through the conventional CFD analysis.

FIG. 8 is a graph showing the relation between the number of grids and drag coefficient for a typical two-dimensional cross section of a middle part of an airfoil determined through CFD analysis. As shown in FIG. 8, the drag coefficient CD varies in an asymptotic curve gradually approaching a predicted grid convergence solution represented by a line L1 with increase of the number of grids. A grid convergence solution corresponds to a solution obtained when the meshes of grid are reduced to a limit. The smaller the meshes of a computation grid, the smaller is the error in the computed convergence solution. Practically, computers have a limited processing ability and, in many cases, are unable to deal with a necessary and sufficient number of computation grids and are unable to achieve computation in a satisfactorily high computational accuracy.

Figure 9:
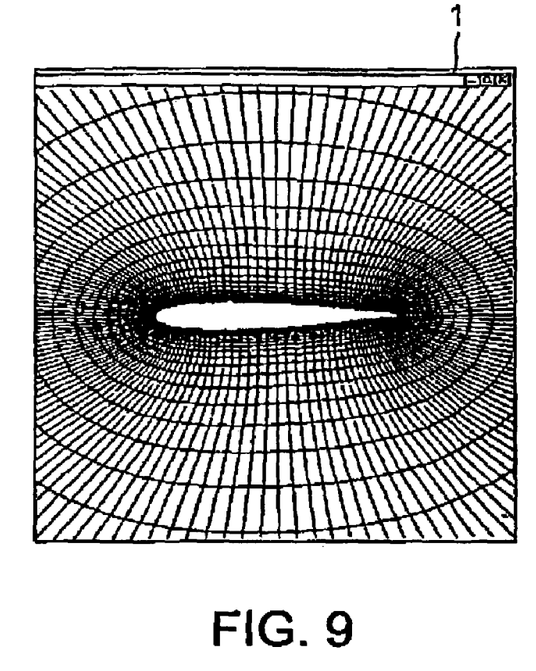
FIG. 9 is a pictorial view of a coarse numerical grid for the computation of airfoil flows displayed on the screen of a display.
Figure 10:
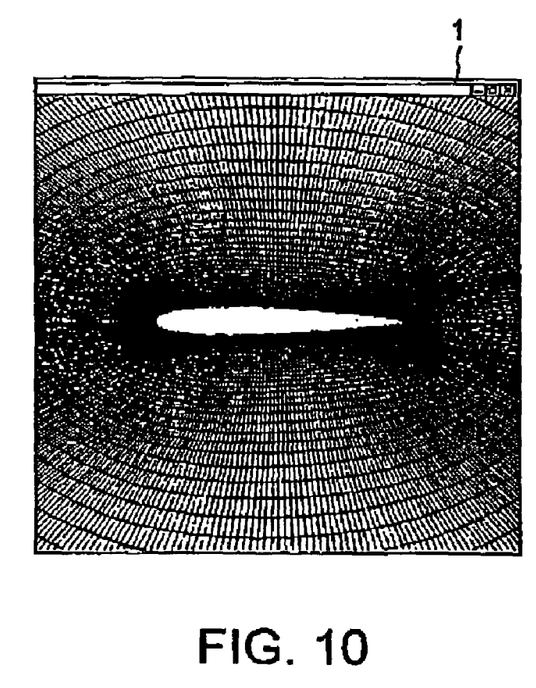
FIG. 10 is a pictorial view of a fine numerical grid for the computation of airfoil flows displayed on the screen of a display.
Figure 11:
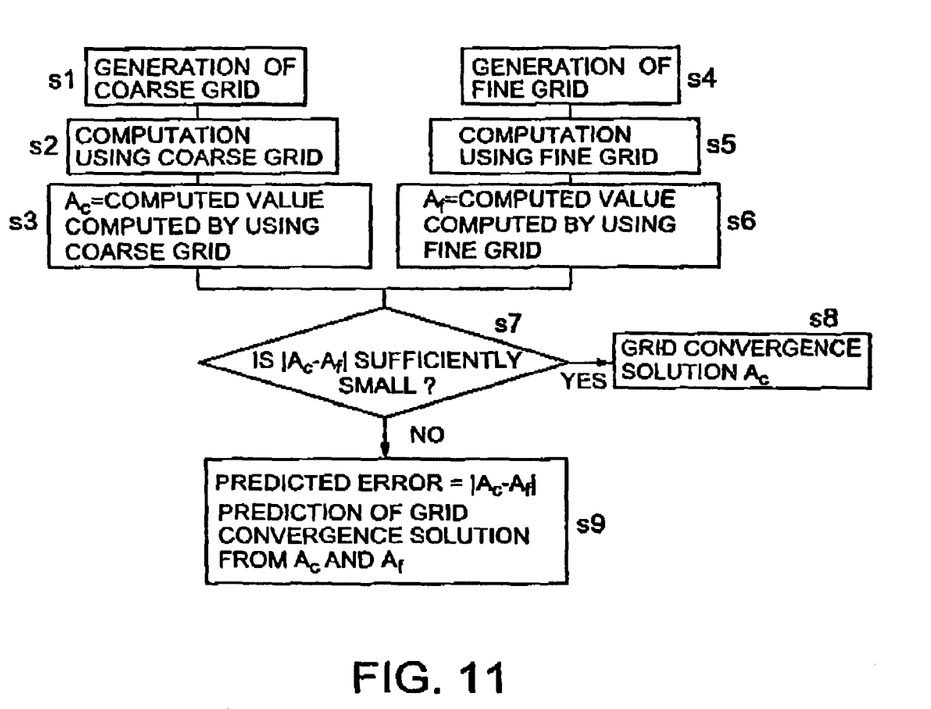
FIG. 11 is a flow chart of a conventional computation system of computing a grid convergence solution and errors.

FIG. 9 is a pictorial view of a coarse numerical grid for the computation of airfoil flows displayed on a screen 1 of a display. FIG. 10 is a pictorial view of a fine numerical grid for the computation of airfoil flows displayed on a screen 1 of a display. FIG. 11 is a flow chart of a conventional computation system of computing a grid convergence solution and errors. A practically applied conventional computation system uses a coarse grid and a fine grid, and predicts the grid convergence solution from computed values obtained through computations using the numerical grids.

Referring to FIGS. 9 to 11, the computation system generates a coarse grid in step s1 executes computations using the coarse grid in step s2, provides a computed value $A_c$ in step s3, and then goes to step s7. On the other hand, the computation system generates a fine grid in step s4, executes computations using the fine grid in step s5, provides a computed value $A_f$ in step s6, and then goes to step s7. In step s7, a query is made to see if the absolute value of the difference between the computed values $A_c$ and $A_f$ is sufficiently small. If the response in step s7 is affirmative, the computed value $A_c$ is decided to be sufficiently approximate to a grid convergence solution in step s8. If the response in step s7 is negative, it is considered that the absolute value of the difference between the computed values $A_c$ and $A_f$ is a predicted error. Then, in step s9, a grid convergence solution is predicted on the basis of the predicted error and the computed values $A_c$ and $A_f$.

This conventional computation system needs much work time for generating the plurality of types of grids, i.e., the coarse grid and the fine grid, for a computational space of a complicated shape. The conventional computation system is unable to use a very fine grid because there is a limit to the processing ability of the computer. The use of an excessively coarse grid reduces computation accuracy extremely. Thus, mesh sizes of practically usable grids are in a relatively narrow range. Therefore, the conventional computation system has a practical difficulty in accurately predicting a grid convergence solution and there is a limit to the conventional computation system in dealing with computational spaces having complicated shapes.

SUMMARY OF THE INVENTION

Accordingly, it is an object of the present invention to provide grid convergence solution computation system and method capable of accurately obtaining a grid convergence solution requiring less computational quantity than the conventional computation system.

According to the first aspect of the present invention, a grid convergence solution computation system for dividing a computational space by a finite number of grid points and computing a grid convergence solution of a difference equation produced by discretizing a partial differential equation dominating a fluid motion, comprises: means for computing a computed value of high-order accuracy by a computational method of high-order accuracy using a single grid, means for computing a computed value of low-order accuracy by a computational method of low-order accuracy using said single grid which is also used in said means for computing said computed value of high-order accuracy, and means for computing a grid convergence solution based on a relation between said computed value of high-order accuracy and said computed value of low-order accuracy on an assumption that a relation between said computed value of high-order accuracy, said computed value of low-order accuracy, and said grid convergence solution is substantially constant regardless of a degree of fineness or coarseness of said grid.

Preferably, the grid convergence solution computation system further comprises means for displaying said grid convergence solution obtained by said means for computing said grid convergence solution.

Preferably, said computed value of high-order accuracy is made to approach said grid convergence solution more rapidly than said computed value of low-order accuracy. Said grid convergence solution is obtained by subtracting said computed value of low-order accuracy from said computed value of high-order accuracy to obtain a difference therebetween, multiplying said difference by a first constant determined beforehand for a computational method to obtain a product, and adding said computed value of high-order accuracy to said product.

Preferably, the grid convergence solution computation system further comprises means for displaying said grid convergence solution obtained by said means for computing said grid convergence solution.

Preferably, a predicted error in said grid convergence solution is obtained by computing an absolute value of a difference between said computed value of high-order accuracy and said computed value of low-order accuracy, and multiplying said absolute value by a second constant determined beforehand for a computational method.

Preferably, the grid convergence solution computation system further comprises means for displaying said predicted error.

Preferably, a predicted error in said grid convergence solution is obtained by computing an absolute value of a difference between said computed value of high-order accuracy and said computed value of low-order accuracy, and multiplying said absolute value by a second constant determined beforehand for a computational method.

Preferably, the grid convergence solution computation system further comprises means for displaying said predicted error.

According to the second aspect of the present invention, a grid convergence solution computation method for dividing a computational space by a finite number of grid points and computing said grid convergence solution of a difference equation produced by discretizing a partial differential equation dominating a fluid motion, comprises: computing a computed value of high-order accuracy by a computational method of high-order accuracy using a single grid, computing a computed value of low-order accuracy by a computational method of low-order accuracy using said single grid which is also used in said computing said computed value of high-order accuracy, and computing a grid convergence solution based on a relation between said computed value of high-order accuracy and said computed value of low-order accuracy on an assumption that a relation between said computed value of high-order accuracy, said computed value of low-order accuracy, and said grid convergence solution is substantially constant regardless or a degree of fineness or coarseness of said grid.

Preferably, the grid convergence solution computation method further comprises displaying said grid convergence solution obtained by said computing said grid convergence solution.

Preferably, said computed value of high-order accuracy is made to approach said grid convergence solution more rapidly than said computed value of low-order accuracy. Said grid convergence solution is obtained by subtracting said computed value of low-order accuracy from said computed value of high-order accuracy to obtain a difference therebetween, multiplying said difference by a first constant determined beforehand for a computational method to obtain a product, and adding said computed value of high-order accuracy to said product.

Preferably, the grid convergence solution computation method further comprises displaying said grid convergence solution obtained by said computing said grid convergence solution.

Preferably, a predicted error in said grid convergence solution is obtained by computing an absolute value of a difference between said computed value of high-order accuracy and said computed value of low-order accuracy, and multiplying said absolute value by a second constant determined beforehand for a computational method.

Preferably, the grid convergence solution computation method further comprises displaying said predicted error.

Preferably, a predicted error in said grid convergence solution is obtained by computing an absolute value of a difference between said computed value of high-order accuracy and said computed value of low-order accuracy, and multiplying said absolute value by a second constant determined beforehand for a computational method.

Preferably, the grid convergence solution computation method further comprises displaying said predicted error.

According to the grid convergence solution computation system or method of the present invention is capable of computing the highly accurate grid convergence solution using the number of computational grids far less than that of computational grids needed by the conventional computation system, does not need to generating a plurality of types grids respectively having different meshes for a computational space of a complicated shape and does not need much work time for generating a plurality of types of grids.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
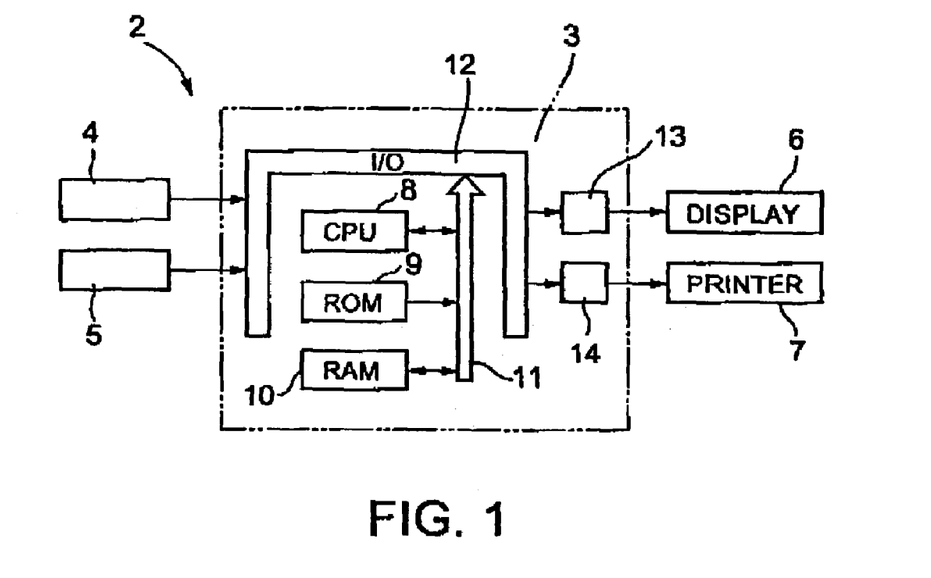
FIG. 1 is a block diagram of a grid convergence solution computation system in a preferred embodiment according to the present invention.

A grid convergence solution computation system in a preferred embodiment according to the present invention is a computer system for computing data on airfoil sections of, for example, a rotor blade for a rotary-wing aircraft. Referring to FIG. 1, the grid convergence solution computing system 2 includes, as principal components, a controller 3, a keyboard 4, a mouse 5, a display 6, and a printer 7. The controller 3 includes a microcomputer comprising a CPU 8, a ROM 9 and a RAM 10, a bus 11, an input/output interface (I/O interface) 12, drive circuits 13 and 14. The bus 11 connects the CPU 8, the ROM 9 and the RAM 10 to the I/o interface 12.

Figure 2:
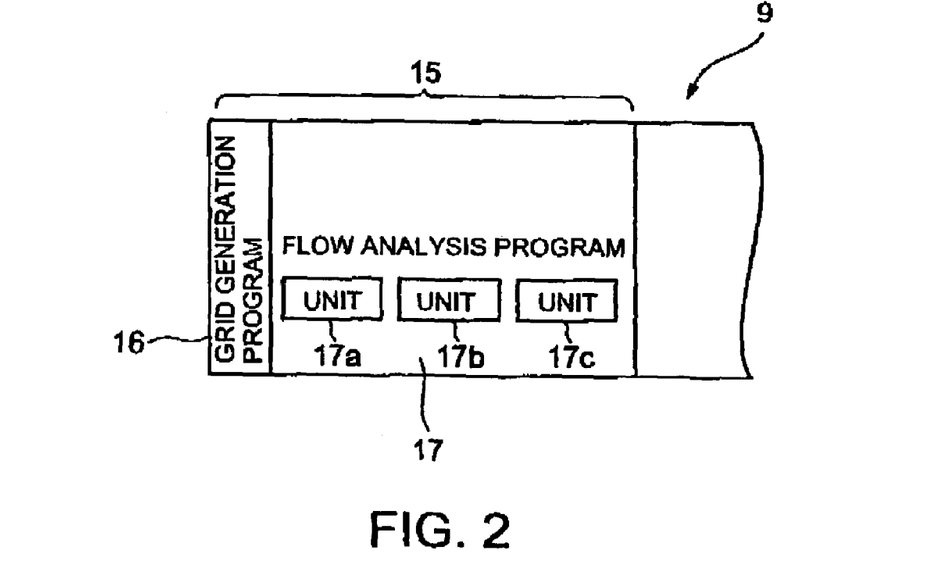
FIG. 2 is a view of assistance in explaining a grid convergence solution computation program.

The keyboard 4 and the mouse 5 are connected to the I/O interface 12. The display 6 and the printer 7 are connected through the drive circuits 13 and 14, respectively, to the I/O interface 12. A grid convergence solution computation program 15 shown in FIG. 2 is loaded from a magnetic medium, not shown, to the ROM 9. Input data is entered by operating the keyboard 4 and the mouse 5, the grid convergence computation program 15 (processing operation) is executed, and computed data obtained through the execution of the grid convergence computation program 15 is displayed by the display 6 or is printed out by the printer 7.

Figure 3:
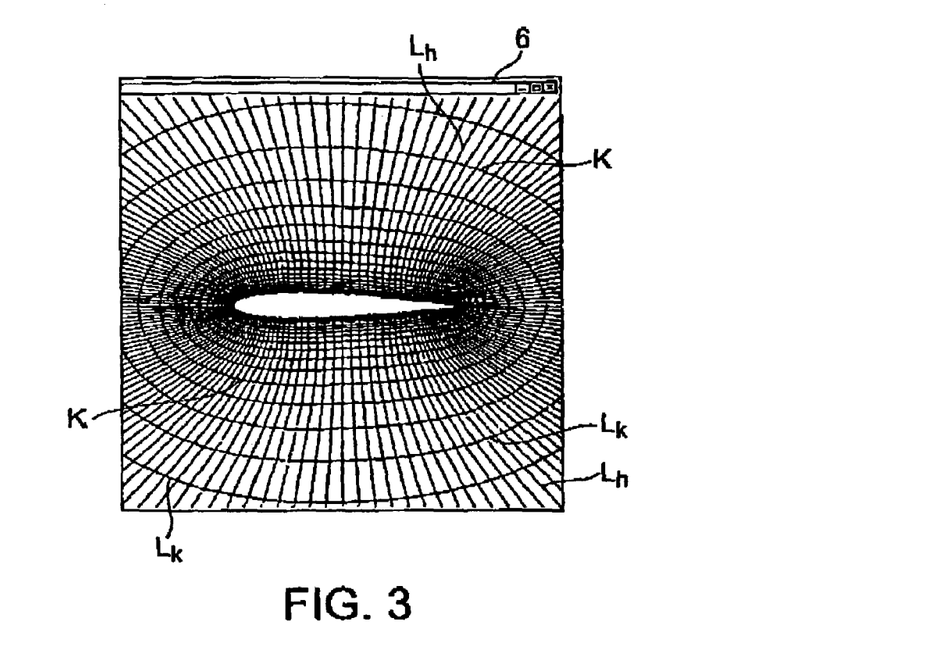
FIG. 3 is a diagram of a grid generated by a grid-generating program and displayed on the screen of a display.

FIG. 2 is a view of assistance in explaining the grid convergence solution computation program 15, and FIG. 3 is a diagram of a grid K generated by executing a grid-generating program 16 by the grid convergence computation system 2 and displayed on the screen of the display 6. The grid convergence computation program 15 includes the grid generation program 16 and a flow analysis program 17. The flow analysis program 17 includes a unit 17a for computing a computed value of high-order accuracy using a single grid, a unit 17b for computing a computed value of low-order accuracy using the same single grid, and a unit 17c for computing a grid convergence solution based on a relation between the computed value of high-order accuracy and the computed value of low-order accuracy.

The number of grids corresponding to the processing ability of the CPU 8, and airfoil profile data are entered into the CPU 8 by operating the keyboard 4 and the mouse 5, and the grid generation program 16 is executed to generate the desired grid K. The grid K has a substantially rectangular shape and is defined by a plurality of radial lines $L_h$, and a plurality of annular lines $L_k$. The plurality of radial lines $L_h$ extend radially outward in directions perpendicular to the outline of the section of the airfoil, respectively. The plurality of annular lines $L_k$ are arranged radially outward at predetermined intervals around the outline. The plurality of radial lines $L_h$ intersect the plurality of annular lines $L_k$. Data including conditions specifying flows including a lift coefficient is entered by operating the keyboard 4 and the mouse 5, and then the flow analysis program 17 is executed using the grid generated by carrying out the grid generation program 16 to analyze the drag coefficient CD of a typical two-dimensional section of, for example, a middle part of the airfoil.

The flow analysis program 17 discretizes the Navier-Stokes equation expressing the flow of a viscous fluid by a partial differential equation by a difference calculus, and computes the grid convergence solution, such as a desired drag coefficient CD, of the discretized difference equation. Predictive computations are executed for a two-dimensional airfoil in a computational space for the grid convergence solution computation system 2.

Figure 4:
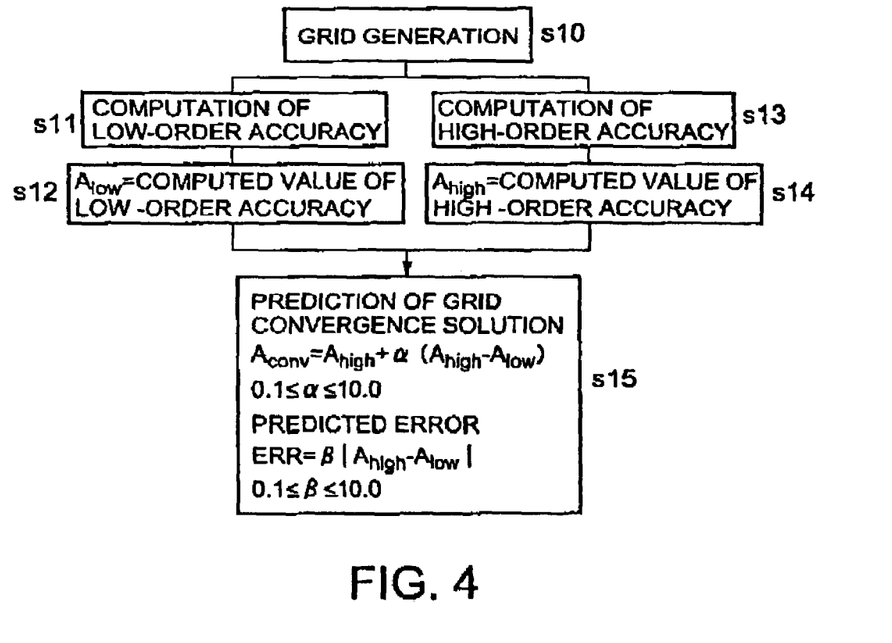
FIG. 4 is a flowchart of a computation method of computing a grid convergence solution and a predicted error in a preferred embodiment according to the present invention.
Figure 5:
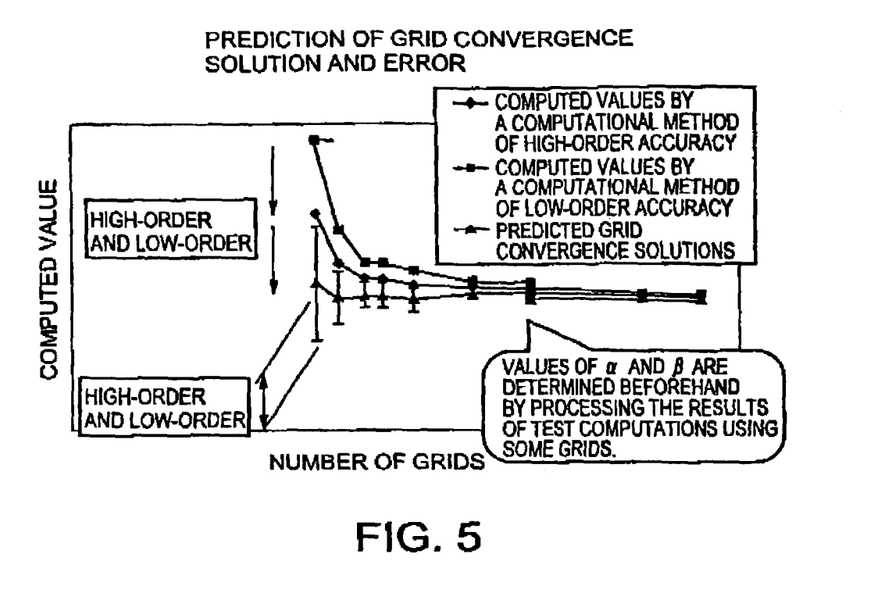
FIG. 5 is a diagram showing the relation between a computed value of high-order accuracy, a computed value of low-order accuracy, and a grid convergence solution.

FIG. 4 is a flowchart of a computation method of computing a grid convergence solution $A_{conv}$ and a predicted error $E_{RR}$ and FIG. 5 is a diagram showing the relation between a computed value of high-order accuracy computed by a computation method of high-order accuracy, a computed value of low-order accuracy computed by a computation method of low-order accuracy, and a grid convergence solution. The computation method of high-order accuracy is, for example, a third-order computation method accurate to the third-order term of the Taylor series development of a differential equation. The computation method of law order accuracy is, for example, a second-order computation method accurate to the second-order term.

Referring to FIG. 4, a single practical grid is generated in step s10, and then steps s11 and s13 are executed by parallel processing using the units 17a and 17b of the flow analysis program 17 shown in FIG. 2. The computation method of low-order accuracy is executed in step s11 using the unit 17b, a computed value $A_{low}$ of low-order accuracy is obtained in step s12, and then the computation method goes to step s15. On the other hand, the computation method of high-order accuracy is executed in step s13 using the unit 17a, a computed value $A_{high}$ of high-order accuracy is obtained in step s14, and then, the computation method goes to step s15. In step s15, a grid convergence solution and a predicted error $E_{RR}$ are computed by the unit 17c with using expressions (1) and (2).

$$A_{conv} = A_{high} + \alpha(A_{high} - A_{low}) \quad (1)$$

$$E_{RR} = \beta |A_{high} - A_{low}| \quad (2)$$

where $\alpha$ is a first constant determined for the computation method and meeting $0.1 \leq \alpha \leq 10.0$, and $\beta$ is a second constant determined for the computation method and meeting $0.1 \leq \beta \leq 100$. Typically, $\alpha=1.0$ and $\beta=1.0$. The first constant $\alpha$ and the second constant $\beta$ are determined beforehand by processing the results of computations using some grids by statistical operations using the method of least squares and the method of calculating standard deviation. More concretely, the first constant $\alpha$ can be determined by using Expression (3), which is a standard equation for the method of least squares. N types of grids respectively of different mesh sizes are prepared for a model problem, and computations of high-order accuracy and low-order accuracy are performed for the i-th grid ($1 \leq i \leq N$).

$$\varepsilon = \sum_{i=1}^{N} \left( \frac{A_{high}(i) + \alpha(A_{high}(i) - A_{low}(i)) - A_f}{|A_{high}(i) - A_{low}(i)|} \right)^2 \quad (3)$$

where $A_{high}(i)$ is a computed value obtained by the computation of high-order accuracy using the unit 17a, and $A_{low}(i)$ is a computed value obtained by the computation of low-order accuracy using the unit 17b. Expression (3) is differentiated with respect to a variable $A_f$ and the first constant $\alpha$ as a variable; and $d\varepsilon/d\alpha=0$ and $d\varepsilon/dA_f=0$ are computed to provide a linear simultaneous equations of the first constant $\alpha$ and the variable $A_f$. The linear simultaneous equations are solved for the first constant $\alpha$ and the variable $A_f$. The second constant $\beta$ is a standard deviation calculated by using Expression (4). The second constant $\beta$ is multiplied by a constant in the range of 0.1 to 10 selected according to the allowable range of errors.

$$\beta = \sqrt{\frac{1}{N} \sum_{i=1}^{N} \left( \frac{A_f - A_{high}(i)}{|A_{high}(i) - A_{low}(i)|} \right)^2} \quad (4)$$

As obvious from FIG. 5, in Expression (1) for computing the grid convergence solution $A_{conv}$, the relation between the computed value $A_{high}$ of high-order accuracy, the computed value $A_{low}$ of low-order accuracy and the grid convergence solution $A_{conv}$ is substantially constant regardless of a degree of fineness or coarseness of the grid, i.e., for a single grid. Therefore, the ratio $A_{high}:A_{low}:A_{conv}$ is substantially constant for all the grids. Since the computed value $A_{high}$ of high-order accuracy approaches the grid convergence solution $A_{conv}$ than the computed value $A_{low}$ of low-order accuracy, the relation expressed by Expression (1) is realized necessarily Thus, the grid convergence solution $A_{conv}$ can be computed by subtracting the computed value $A_{low}$ of low-order accuracy from the computed value $A_{high}$ of high-order accuracy to obtain a difference therebetween, multiplying the difference by the first constant $\alpha$ to obtain a product, and adding the computed value $A_{high}$ of high-order accuracy to the product. The grid convergence solution $A_{conv}$ thus computed is sent through the I/O interface 12 and the drive circuit 13 to the display 6 for displaying or through the I/O interface 12 and the drive circuit 14 to the printer 7 for printing. The grid convergence solution $A_{conv}$ is stored in the work memory, not shown, of the RAM 10. When necessary, the grid convergence solution $A_{conv}$ is read from the work memory and is give to the display 6 for displaying or to the printer 7 for printing.

A predicted error ERR in the grid convergence solution $A_{conv}$ is computed by using Expression (2); the absolute value of the difference between the computed value $A_{high}$ of high-order accuracy and the computed value $A_{low}$ of low-order accuracy is computed, and the absolute value is multiplied by the second constant β to provide the predicted error ERR. The predicted error ERR is sent through the I/O interface 12 and the drive circuit 13 to the display 6 for displaying or through the I/O interface 12 and the drive circuit 14 to the printer 7 for printing.

Figure 6:
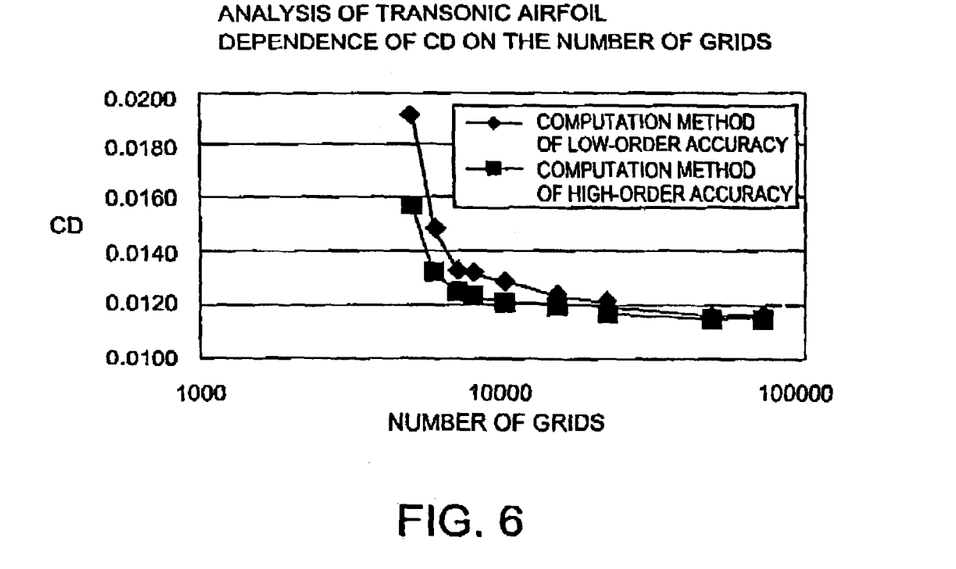
FIG. 6 is a graph showing the relation between the number of grids and section drag coefficient for a two-dimensional cross section of a middle part of an airfoil.

FIG. 6 is a graph showing the relation between the number of grids and drag coefficient CD for the typical two-dimensional section of a middle part of an airfoil, determined by computation. Input data includes data on the NACA 0012 airfoil, lift coefficient CL=0.2, and Mach number M=0.75. To compute and display the grid convergence solution at the drag coefficient CD, the first constant α and the second constant β are determined beforehand, the practical number of grids corresponding to the processing ability of the CPU 8, and data on the NACA 0012 airfoil are entered by operating the keyboard 4 and the mouse 5, and the grid generation program 16 is executed to generate a desired grid.

Then, the flow analysis program 17 is executed; input data including lift coefficient CL=0.2 and Mach number M=0.75 is entered by operating the keyboard 4 and the mouse 5, and the grid convergence solution at the drag coefficient CD is computed using the grid generated by executing the grid generation program 16. The thus computed grid convergence solution at the drag coefficient CD is sent through the I/O interface 12 and the drive circuit 13 to the display 6 for displaying or through the I/O interface 12 and the drive circuit 14 to the printer 7 for printing. The convergence solution is stored in the work memory of the RAM 10 and is read from the work memory and sent to the display 6 or the printer 7 when necessary.

A wind tunnel test model is formed on the basis of the grid convergence solution at the drag coefficient CD and other grid convergence solutions, the computed grid convergence solution and the results of wind tunnel tests are compared to see if the grid convergence solution obtained by the grid convergence solution computation system agrees satisfactorily with experimental results.

The grid convergence solution computation system for computing the grid convergence solution $A_{conv}$ computes the computed value $A_{high}$ of high-order accuracy by the computational method of high-order accuracy using the unit 17a with the single grid, computes the computed value $A_{low}$ of low-order accuracy by the computational method of low-order accuracy using the unit 17b with the single grid, computes the grid convergence solution $A_{conv}$ on the basis of the relation between the computed value $A_{high}$ of high-order accuracy and the computed value $A_{low}$ of low-order accuracy on an assumption that the relation between the computed value $A_{high}$ of high-order accuracy, the computed value $A_{high}$ of low-order accuracy, and the grid convergence solution $A_{conv}$ is substantially constant regardless of a degree of fineness or coarseness of the grid, and displays the grid convergence solution $A_{conv}$.

Thus, the grid convergence solution computation system of the preferred embodiment according to the present invention is capable of computing the highly accurate grid convergence solution $A_{conv}$ using the number of computational grids far less than that of computational grids needed by the conventional computation system, does not need to generating a plurality of types grids respectively having different meshes for a computational space of a complicated shape and does not need much work time for generating a plurality of types of grids. More concretely, the grid convergence solution computation system of the preferred embodiment according to the present invention is capable of computing the highly accurate grid convergence solution $A_{conv}$ in a small fraction of time required by the conventional computation system. Thus, the grid convergence solution computation system of the present invention reduces greatly time necessary for designing and developing.

The grid convergence solution computation system of the preferred embodiment according to the present invention subtracts the computed value $A_{low}$ of low-order accuracy from the computed value $A_{high}$ of high-order accuracy to obtain a difference therebetween, multiplies the difference by the first constant α to obtain a product, adds the computed value $A_{high}$ of high-order accuracy to the product to obtain the grid convergence solution $A_{conv}$, and sends the grid convergence solution $A_{conv}$ to the display 6 for displaying or to the printer 7 for printing.

The grid convergence solution computation system of the preferred embodiment according to the present invention determines the second constant β beforehand, computes the absolute value of the difference between the computed value $A_{high}$ of high-order accuracy and the computed value $A_{low}$ of low-order accuracy, multiplies the absolute value by the second constant β to compute the predicted error ERR, and sends the predicted error ERR to the display 6 for displaying or to the printer 7 for printing.

Figure 7:
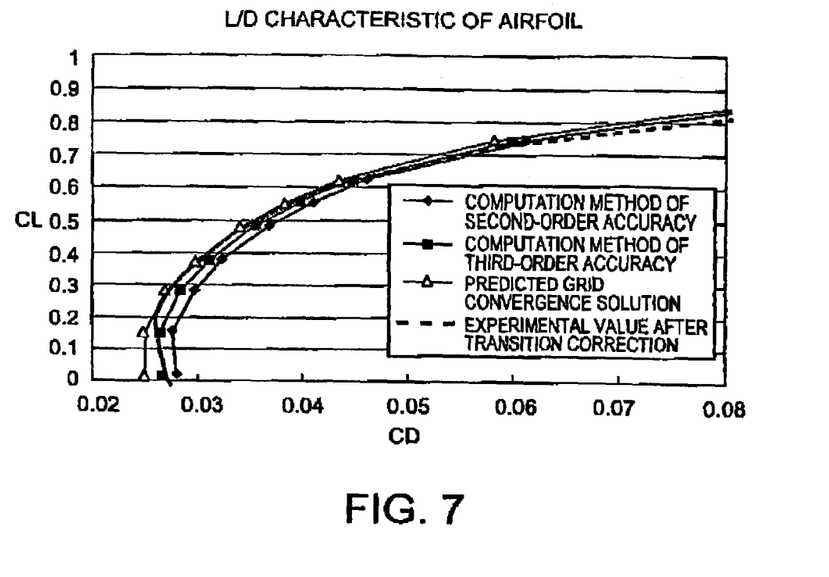
FIG. 7 is a graph comparatively showing data on the lift/drag characteristic of an airfoil obtained by computation by grid convergence solution computation methods and experiments.

FIG. 7 is a graph comparatively showing data on the lift/drag, characteristic of an airfoil for an aircraft obtained by computation by the grid convergence solution computation methods and experiments. The grid convergence solution $A_{conv}$ and experimental values are shown for comparison. Sometimes, the grid convergence solution computation system of the present invention is applied to the prediction of the lift/drag characteristic of an airfoil for an aircraft. Since computed values and experimental values differ from each other in the condition of laminar-flow-to-turbulence transition, the experimental values are corrected by transition correction. In a medium lift range corresponding to a lift coefficient CL range of about 0.2 to 0.6, computed values of third-order accuracy is closer than computed values of second-order accuracy to the experimental values. It is known that the grid convergence solution computed by the grid convergence solution computing system agree substantially with the experimental value in the medium lift range.

Functions varying in the range of ±10% and substantially equivalent to the first constant α and the second constant β may be used. Although this embodiment performs predictive computations for a two-dimensional airfoil in a computational space, predictive computations may be performed for a three-dimensional airfoil. The grid convergence solution computation program 15 may be stored in a controller included in a supercomputer, a plurality of computers may be connected to the supercomputer, the computation program 15 may be executed using input data represented by input signals provided by the computers, and a grid convergence solution may be displayed by displays connected to the computers or printed out by printers connected to the computers.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A grid convergence solution computation system for dividing a computational space by a finite number of grid points and computing a grid convergence solution of a difference equation produced by discretizing a partial differential equation dominating a fluid motion, comprising:

means for computing a computed value $A_{high}$ of high-order accuracy by a computational method of high-order accuracy using a single grid, means for computing a computed value $A_{low}$ of low-order accuracy by a computational method of low-order accuracy using said single grid which is also used in said means for computing said computed value of high-order accuracy, and means for computing a grid convergence solution $A_{conv}$ based on a relation between said computed value of high-order accuracy and said computed value of low-order accuracy on an assumption that a relation between said computed value of high-order accuracy, said computed value of low-order accuracy, and said grid convergence solution is substantially constant regardless of a degree of fineness or coarseness of said grid, wherein the grid convergence solution $A_{conv} = A_{high} + \alpha (A_{high} - A_{low})$, where $0.1 \leq \alpha \leq 10.0$.

2. The grid convergence solution computation system according to claim 1, further comprising means for displaying said grid convergence solution obtained by said means for computing said grid convergence solution.

3. The grid convergence solution computation system according to claim 1, wherein said computed value of high-order accuracy is made to approach said grid convergence solution more rapidly than said computed value of low-order accuracy, wherein $\alpha$ is determined beforehand.

4. The grid convergence solution computation system according to claim 3, further comprising means for displaying said grid convergence solution obtained by said means for computing said grid convergence solution.

5. The grid convergence solution computation system according to claim 3, wherein a predicted error in said grid convergence solution is obtained by computing an absolute value of a difference between said computed value of high-order accuracy and said computed value of low-order accuracy, and multiplying said absolute value by a second constant determined beforehand for a computational method.

6. The grid convergence solution computation system according to claim 5, further comprising means for displaying said predicted error.

7. The grid convergence solution computation system according to claim 1, wherein a predicted error in said grid convergence solution is obtained by computing an absolute value of a difference between said computed value of high-order accuracy and said computed value of low-order accuracy, and multiplying said absolute value by a second constant determined beforehand for a computational method.

8. The grid convergence solution computation system according to claim 7, further comprising means for displaying said predicted error.

9. A grid convergence solution computation method for dividing a computational space by a finite number of grid points and computing said grid convergence solution of a difference equation produced by discretizing a partial differential equation dominating a fluid motion, comprising:

computing a computed value $A_{high}$ of high-order accuracy by a computational method of high-order accuracy using a single grid, computing a computed value $A_{low}$ of low-order accuracy by a computational method of low-order accuracy using said single grid which is also used in said computing said computed value of high-order accuracy, and computing a grid convergence solution $A_{conv}$ based on a relation between said computed value of high-order accuracy and said computed value of low-order accuracy on an assumption that a relation between said computed value of high-order accuracy, said computed value of low-order accuracy, and said grid convergence solution is substantially constant regardless of a degree of fineness or coarseness of said grid, wherein the grid convergence solution $A_{conv} = A_{high} + \alpha (A_{high} - A_{low})$, where $0.1 \leq \alpha \leq 10.0$.

10. The grid convergence solution computation method according to claim 9, further comprising displaying said grid convergence solution obtained by said computing said grid convergence solution.

11. The grid convergence solution computation method according to claim 9, wherein said computed value of high-order accuracy is made to approach said grid convergence solution more rapidly than said computed value of low-order accuracy, wherein $\alpha$ is determined beforehand.

12. The grid convergence solution computation method according to claim 11, further comprising displaying said grid convergence solution obtained by said computing said grid convergence solution.

13. The grid convergence solution computation method according to claim 11, wherein a predicted error in said grid convergence solution is obtained by computing an absolute value of a difference between said computed value of high-order accuracy and said computed value of low-order accuracy, and multiplying said absolute value by a second constant determined beforehand for a computational method.

14. The grid convergence solution computation method according to claim 13, further comprising displaying said predicted error.

15. The grid convergence solution computation method according to claim 9, wherein a predicted error in said grid convergence solution is obtained by computing an absolute value of a difference between said computed value of high-order accuracy and said computed value of low-order accuracy, and multiplying said absolute value by a second constant determined beforehand for a computational method.

16. The grid convergence solution computation method according to claim 13, further comprising displaying said predicted error.

* * * * *